3,061,646
PROCESS FOR PARTIAL OXIDATION OF ETHANE TO PRODUCE FORMALDEHYDE
William Bartok, Cranford, and Carl E. Heath, Nixon, N.J., assignors to Esso Research and Engineering Company, a corporation of Delaware
No Drawing. Filed Dec. 30, 1959, Ser. No. 862,783
10 Claims. (Cl. 260—604)

This invention relates to a process for preparing formaldehyde. In particular this invention relates to a process for preparing formaldehyde directly from ethane by a novel vapor-phase oxidation technique in the presence of aluminum. More particularly, this invention relates to the production of formaldehyde by the oxidation of gaseous ethane at a temperature in the range of about 400° to 800° F. with a gas containing molecular oxygen and ozone in a reaction zone having an aluminum surface to volume ratio of 6 cm.$^{-1}$ or higher. The term "cm.$^{-1}$" is used herein as it is conventionally employed in the literature to designate the ratio of square centimeters of surface/cubic centimeters of volume.

Formaldehyde is, of course, a well-known commercial chemical which finds utility in various fields. For example, it is known extensively as a reagent, preservative, antiseptic and as a component of many valuable commercial resins, e.g. phenol-formaldehyde, urea-formaldehyde, melamine-formaldehyde, etc.

Preparation of formaldehyde from ethane at very high temperatures, i.e. above 600° C. (1112° F.), in the presence of vitreous material is known in the art, e.g. U.S. Patent 1,729,711. For many reasons it is preferable to operate such a reaction at as low a temperature as possible which will still afford high selectivities to formaldehyde. Thus, feed losses to excessive decomposition can be minimized and temperature control is more easily maintained.

Maximum selectivity to partially oxygenated products is obtained by operating below about 700°–800° F. where the formation of the final products of oxidation, carbon oxides, is minimized. However, the reaction of ethane with ozonized oxygen or air in this low temperature range will, except under certain definite conditions, give rise to yields of formaldehyde and acetaldehyde in comparable proportions.

It has now been discovered that formaldehyde can be prepared directly from ethane at temperatures in the range of 400° to 800°, preferably 400° to 600°, F. with unexpectedly high selectivities under certain critical conditions.

The reaction may be carried out in a reaction zone wherein the interior surfaces present to the reactants therein an aluminum surface to volume ratio of above about 6 cm.$^{-1}$, e.g. 6 to 15, particularly 6 to 10, cm.$^{-1}$. The particular form of the reactor is not critical. For example, a very simple type of reactor would comprise an open tube which is maintained, by external heat exchange, at the desired temperature level. In addition to external heat exchange, an inert gas diluent is employed to aid in temperature control. Gases such as $N_2$, $CO_2$ and the like are suitable. The total oxidizing gas mixture should include in addition to oxygen and ozone about 50 to 95 volume percent of such inert gas. The reactant ethane, the oxygen and ozone are then simply passed through the tube at a predetermined space velocity. The gaseous reaction product mixture is then condensed to form a liquid mixture of oxygenated products which is separated into its component parts. There are, however, more complex oxidation reactors which are amenable to this process. Those skilled in the art will realize that various modifications in reactor design may be made wherein single or multiple reaction zones, packed or unpacked chambers employing single or multiple reactant inlets may be advantageously employed within the scope of this invention so long as the aluminum surface to volume ratios hereinbefore set forth are met.

Another factor governing the conditions employed is the degree of conversion desired. With simple oxidation reactors where the temperature is difficult to control, it is advisable to maintain the conversion level rather low in order to avoid runaway temperatures. On the other hand, where more advanced oxidation reactors are used wherein good control of temperatures is possible, higher conversions may be obtained. The mole ratio of $O_2$ to ethane is preferably maintained between 0.2 to 1.0, preferably about 0.3 to 0.5. Ozone must be employed to effect the desired conversion of ethane to formaldehyde. Amounts in the range of about 0.5 to 5 volume percent based on oxygen may be employed. To obtain high selectivities to formaldehyde the ozone concentration in the reaction zone should be made in the range of 0.5 to 2.5, preferably 0.5 to 1.0, wt. percent based on ethane present.

The specific feed rates, contact time, oxygen partial pressure and other conditions may vary somewhat according to the efficiency of the reactor employed.

The optimum contact time for this vapor phase reaction will vary according to the temperature, pressure and the oxidant employed. For the simple open tube type ractor wherein the conversion is maintained at a low level, a contact time between 0.5 to 4 seconds is preferred. The conversion level is relatively unimportant since the off-gases may be recycled to the reactor after condensation of the oxy products. CO and $CO_2$ may be removed from the off-gases by absorption in diethanolamine solutions, etc. Unreacted oxygen and ethane may be recycled to the reactor where ozone may be added.

The preferred hydrocarbon feedstock is essentially pure ethane. However, a $C_1$–$C_4$ hydrocarbon stream containing a major amount of ethane may be satisfactorily employed.

In carrying out the process of this invention both the oxidizing gas and the ethane are preferably preheated to the desired temperature of reaction or slightly below and brought into contact with each other in a reaction zone maintained at the desired temperature of reaction. The ethane and oxidizing gas may be premixed and introduced into the reaction zone as a single stream or each may be introduced into the reaction zone separately. The oxygenated products formed may be separated from unreacted ethane by scrubbing with water or other conventional aqueous wash solutions or mixtures. Formaldehyde may then be separated from the gross oxygenated product by conventional distillation techniques and other conventional methods of separation.

The following example demonstrates the criticality of the conditions hereinbefore described. Conversion was deliberately maintained at a relatively low level, i.e. 5–10%, in order to avoid runaway temperature with a simple type of reactor.

*Example 1*

A mixture of air containing $O_3$ and ethane, in an $O_2/C_2H_6$ mole ratio of 0.4 is preheated to about 400° F. and passed into a squat cylindrical reaction zone having an internal diameter of about 3.02 inches and a length of about 1.5 inches. The reaction zone is packed and lined with aluminum foil. The aluminum surface to volume ratio in the reaction zone is 6 cm.$^{-1}$. The reaction zone is maintained at a temperature of about 500° F. The concentration of ozone in the reaction zone is maintained at about 0.9 wt. percent. Contact time is about 2 seconds. The reaction product containing effluent is passed from the reactor to a condenser wherein liquid product is formed. The oxygenated product is washed with water containing about 0.1 wt. percent hydroquinone, separated and analyzed.

Analysis of the gross oxygenated product obtained reveals a selectivity to the various components thereof in terms of wt. percent based on weight of ethane converted to be as follows:

| | |
|---|---|
| Formaldehyde | 77.22 |
| Acetaldehyde | 21.45 |
| Formic acid | 4.95 |
| Acetic acid | 5.83 |
| Peroxide (as $C_2H_5OOH$) | 1.6 |

A second run is made as in the first run except that the aluminum surface to volume ratio is about 4 cm.$^{-1}$. Analysis of the gross oxygenated product obtained reveals an appreciably lower selectivity to formaldehyde.

A third run is made as in the first run except that a temperature of 300° F. is maintained in the reaction zone. Analysis of the gross oxygenated product reveals a decreased selectivity to formaldehyde and an appreciable increase in selectivity to formic acid.

A fourth run is made as in the first run except that the temperature employed in the reaction zone is about 600° F. Analysis of the gross oxygenated product reveals a selectivity to formaldehyde of about 80 wt. percent based on converted ethane.

A fifth run is made as in the first run except that a reactor is employed having an aluminum lined reaction zone wherein the aluminum surface to volume ratio is 10 cm.$^{-1}$. Analysis of the gross oxygenated product obtained reveals a selectivity to formaldehyde in exess of 80 wt. percent based on converted ethane.

A sixth run is made as in the first run except that a reactor is employed having a reaction zone wherein the aluminum surface to volume ratio is 8 cm.$^{-1}$ and is maintained at a temperature of about 800° F. Analysis of the gross oxygenated product obtained reveals a selectivity to formaldehyde of above 90 wt. percent based on converted ethane.

A seventh run is made as in the first run except that the $O_2$ to $C_2H_6$ ratio is maintained at about 0.8. Analysis of the gross oxygenated product obtained reveals no appreciable change in selectivity to formaldehyde in comparison to the first run.

An eighth run is made as in the first run except that the ozone concentration in the reaction zone is maintained at about 2.7 wt. percent based on ethane present. Analysis of the gross oxygenated product obtained reveals a higher selectivity to acetic and formic acids and a lower selectivity to formaldehyde.

A ninth run is made as in the first run except using a reactor lined with quartz and having a surface to volume ratio of about 3.0 cm.$^{-1}$. Analysis of the gross oxygenated product reveals a drop in selectivity to formaldehyde as compared to the first run of above 20%.

A tenth run is made as in the first run except that the surface to volume ratio is about 6.5 cm.$^{-1}$ and the surface is stainless steel. The selectivity to formaldehyde is again below that of the first run.

What is claimed is:

1. A process for producing formaldehyde which comprises contacting ethane and molecular oxygen in an $O_2$ to ethane mole ratio of about 0.2 to 1 with 0.5 to 2.5 wt. percent ozone based on ethane at a temperature in the range of 400° to 800° F. in a reaction zone having an aluminum surface to volume ratio in the range of about 6 to 15 cm.$^{-1}$.

2. A process in according with claim 1 wherein said temperature is in the range of 450° to 700° F.

3. A process in accordance with claim 1 wherein said $O_2$ to ethane ratio is in the range of 0.3 to 0.5.

4. A process in accordance with claim 1 wherein the concentration of ozone in said reaction zone is in the range of 0.5 to 1.0 wt. percent on ethane.

5. A process in accordance with claim 1 wherein said aluminum surface to volume ratio is in the range of about 6 to 10 cm.$^{-1}$.

6. A process for producing formaldehyde which comprises contacting ethane with molecular oxygen in an $O_2$ to ethane mole ratio of about 0.2 to 1 with 0.5 to 2.5 wt. percent ozone based on ethane at a temperature in the range of 400° to 800° F. in a reaction zone having an aluminum surface to volume ratio in the range of 6 to 10 cm.$^{-1}$.

7. A process in accordance with claim 6 wherein said temperature is in the range of 400° to 600° F.

8. A process for producing formaldehyde which comprises contacting ethane with a gas mixture containing 50 to 95 volume percent of an inert gas and 5 to 50 volume percent of an oxidant containing 95 to 99 volume percent molecular oxygen and 1 to 5 volume percent ozone for a time in the range of 0.5 to 4 seconds in a reaction zone having an aluminum surface to volume ratio in the range of 6 to 15 cm.$^{-1}$ at a temperature in the range of 400° to 800° F.

9. A process in accordance with claim 8 wherein said time is in the range of 2 to 3 seconds.

10. A process in accordance with claim 8 wherein said gas mixture is 95 to 99 vol. percent air and 1 to 5 volume percent ozone.

References Cited in the file of this patent

UNITED STATES PATENTS

| | | |
|---|---|---|
| 1,423,753 | Carter et al. | July 25, 1922 |
| 2,775,601 | Gardner et al. | Dec. 25, 1956 |
| 2,974,173 | Long et al. | Mar. 7, 1961 |